United States Patent [19]
Kook et al.

[11] Patent Number: 5,452,522
[45] Date of Patent: Sep. 26, 1995

[54] CALIBRATED BEVEL SQUARE WITH INTEGRATED ELECTRONIC LEVEL AND PLUMB

[75] Inventors: Donald D. Kook; Gary R. Schultheis; John R. Stauss, all of Los Gatos; Douglas R. Grundstrom, San Jose, all of Calif.

[73] Assignee: Zircon Corporation, Campbell, Calif.

[21] Appl. No.: 289,726

[22] Filed: Aug. 12, 1994

[51] Int. Cl.[6] .............................. B43L 7/12; G01C 17/00
[52] U.S. Cl. .................... 33/451; 33/423; 33/418
[58] Field of Search ............... 33/1 G, 366, 399, 33/404, 416, 417, 418, 422, 423, 424, 451, 452, 455, 456, 465, 468, 469, 471, 476, 495, 500, 534, 538, 558.2

[56] References Cited

U.S. PATENT DOCUMENTS

| | | | |
|---|---|---|---|
| 70,547 | 11/1867 | Graham | 33/452 |
| 743,900 | 11/1903 | Mahan | 33/423 |
| 928,569 | 7/1909 | Williams | 33/423 |
| 1,074,969 | 10/1913 | Moore | 33/423 |
| 1,453,625 | 5/1923 | Johnson | 33/418 |
| 1,913,919 | 6/1933 | Dion | 33/423 |
| 3,289,301 | 12/1966 | Hanson . | |
| 3,945,129 | 3/1976 | Bergkvist | 33/399 |
| 5,083,383 | 1/1992 | Heger | 33/366 |
| 5,121,553 | 6/1992 | Boerder | 33/465 |
| 5,259,118 | 11/1993 | Heger | 33/366 |

FOREIGN PATENT DOCUMENTS

| | | | |
|---|---|---|---|
| 21413 | 5/1906 | United Kingdom | 33/418 |

OTHER PUBLICATIONS

Mayes Selling Card, Mayes Brothers Tool Mfg. Co., Johnson City, Tenn. (2 sides). Pre–Aug. 1994.
Inogon Brochure, Borel & Dunner, Inc., Novi, Mich. (2 sides). Pre–Aug. 1994.
Wedge Innovations Brochure, Santa Clara, Calif. (2 sides). Pre–Aug. 1994.
Zircon Corporation Advertisement (2 pages). Pre–Aug. 1994.

*Primary Examiner*—William A. Cuchlinski, Jr.
*Assistant Examiner*—G. Bradley Bennett
*Attorney, Agent, or Firm*—Skjerven, Morrill, MacPherson, Franklin, & Friel

[57] ABSTRACT

A framing layout tool includes two squares each with two legs or blades 90° apart. The squares are pivotally attached at their vertices by a pivot pin including a knurled locking nut. One of the squares includes a longitudinally aligned electronic plumb and level indicator on one of the legs. The other leg of that square includes indicia on a leg reference edge for indicating rise-over-run integers representative of the angular separation of that other leg and a leg of the other square. Indicia indicating the actual angle between such legs is also contained on an opposite reference edge of that other leg. The layout tool has particular utility for accurately marking the location of a plumb cut, seat cuts and a ridge cut in roof rafters where the blade of the second square is placed on an inclined rafter and oriented with the electronic level in a vertical plumb position. When a visual and auditory indication of exact plumb is obtained the clamping nut is locked. Using the locked device, the angle of inclination can be read and locked unit used to scribe cutting lines on a rafter to have the same inclination as the first measured rafter.

13 Claims, 4 Drawing Sheets

CALIBRATED BEVEL SQUARE WITH INTEGRATED ELECTRONIC LEVEL AND PLUMB

BACKGROUND OF THE INVENTION

1. Field of the Invention

This invention relates to a layout tool for measuring inclination of objects, and for rapidly determining the complementary angle of inclination and the perpendicular to the given angle of inclination. More particularly, the invention relates to a wood framing layout tool and method for indicating and scribing for angular cuts to be made in roof rafters.

2. Material Art

A number of framing layout tools have been utilized to assist professional and amateur carpenters in particular for roof framing construction. During the construction of roofs or other structures using inclined members, it is necessary to perform a series of accurate angular cuts on these members to allow them to fit into place with a minimum of error, thus enhancing their structural integrity. The required cuts on a typical roof rafter are shown in FIG. 1. The inclinations involved are most often expressed in terms of rise-over-run e.g., "4 in 12" means a rise of 4 inches over a horizontal distance of 12 inches. Carpenters think in these terms when dealing with inclination.

The layout of these cuts is most often performed with a carpenter's square—a square with graduations on each edge which allow the user to set the tool to whatever rise-over-run inclination is desired. Typically the required inclination would be determined by the plans for the structure. There are any number of variations on the carpenter's square commonly available.

The process of remodeling offers a different set of challenges to the carpenter. Instead of having a set of plans to work from, the remodeler is typically faced with the task of matching an existing inclination which will usually not be an exact, nominal, rise-over-run inclination. Further, from naturally caused changes such as settling and earthquakes the inclinations of the rafters may have changed. There currently exist a number of devices for measuring the inclination of a member. Perhaps the most common type is the bevel-square, a device which allows the user to 'capture' the angle between the given member and another adjacent member without actually measuring the angle. This tool allows the angle to be transferred only. A serious limitation of the bevel square is that it requires the members to be adjacent for a measurement to be taken. Often, access to only the inclined member is available, rendering the tool useless.

A second class of devices use a bubble-vial type level in conjunction with one or more measuring blades and graduated scales. Some of these tools allow the user to determine the angle of inclination only with respect to the horizontal. Many of them also have means for locking the measurement for future transfer without resetting. An available device is the Squangle tool U.S. Pat. No. 3,289,301 where a straight slotted bar is pivotably pin connected at one end to a slotted L-shaped blade, the respective slots containing a common slidable and clampable second pin. A bubble-vial level is recessed in a linear edge of the slotted bar at a bar end opposite to the first pin connection. The patent document shows a second transverse bubble-vial. A serious limitation of these devices is caused by the use of the bubble-vial level. Due to the nature of the measurement situation, these tools are often used in positions which make the reading and accurate interpretation of the level vial difficult or impossible.

A third class of devices comprises an electronic level with digital angle readout as exemplified by the Smart Level™ available from WEDGE Inventions, Santa Clara, Calif. and the INOGON® angle indicator U.S. Pat. No. 3,945,129 available from Borel & Dummer, Inc. of Novi, Mich. marked U.S. Pat. No. 3,945,129. These tools allow the user to measure the inclination of any member in any orientation. The main drawback to these devices is that once the inclination is known, the information must then be transferred to a traditional layout tool such as the carpenter's square to perform the layout. An additional limitation arises from the fact that the inclination of an existing member is seldom a precise integer rise-over-run (e.g., 2/12.3/12, . . .). The level will measure the angle with resolution on the order of 0.2 or 0.1 degree. The framing layout tool to which this number must be transferred, however, does not have any such resolution. They generally have only integer rise-over-run markings, and thus a loss in accuracy arises in transferring the actual inclination to the layout.

SUMMARY OF THE INVENTION

The current invention is an improvement over tools in all three classes of devices. Like tools in the second class, it offers the ability to use a gravitational reference as opposed to devices in the first class which only measure angles between adjacent members. Unlike other tools in the second class, however, it preferably utilizes an electronic level which indicates both level and plumb to a very fine resolution using both audible and visual means. As a result, the user does not need visual contact with the tool when it is in use. Finally, it overcomes the limitations of devices in the third class by integrating the layout tool with the level or plumb measurement, thereby ensuring maximum fidelity of the transfer of the angle from the existing inclined member to the newly laid-out workpiece.

The framing layout tool of the invention utilizes two essentially planar squares which are joined together and allowed to pivot 360 degrees in one embodiment and 270° in another embodiment relative to each other at their vertices in a single sliding abutting plane. In addition to the pivot pin joint, clamping means is provided at the joint to allow a desired angular relationship between the squares to be held or locked.

One of the squares includes an attached electronic plumb and level fixed and oriented along the longitudinal axis of the outer surface of one of the 90° legs forming that square. The other leg of this square has markings in the form of indicia corresponding to different inclination angles printed on its inner side. The outer side of this other leg of the first square contains rise-over-run indicia showing both the integer of that relationship and linear pitch or angle graduations. The second square has symmetrical blades at a 90° angle extending from the pinned vertex and generally may or may not have markings.

When the two squares are moved past one another, one edge of the blade of the second square is always passing under the markings on the blade of the first square allowing the user to read off an angle directly. Depending upon how the unit is being used, the angle can represent several relationships:

A) The acute angle between two objects,

B) The complement of the acute angle between two objects, or

C) The supplement of the obtuse angle between two objects.

The device may also be used as an electronic protractor. Using the electronic level, the angle of inclination or complement of angle of inclination of an object may be measured, and, using the locking feature, the above angles may be transferred to another workpiece.

In practice in a remodeling situation, it might be required to lay out a new rafter to match an existing roof pitch. The layout tool of the invention may be utilized to practice a novel method of determining the proper plumb cut, ridge cut and seat cuts of a new rafter.

DETAILED DESCRIPTION

Figure 1:
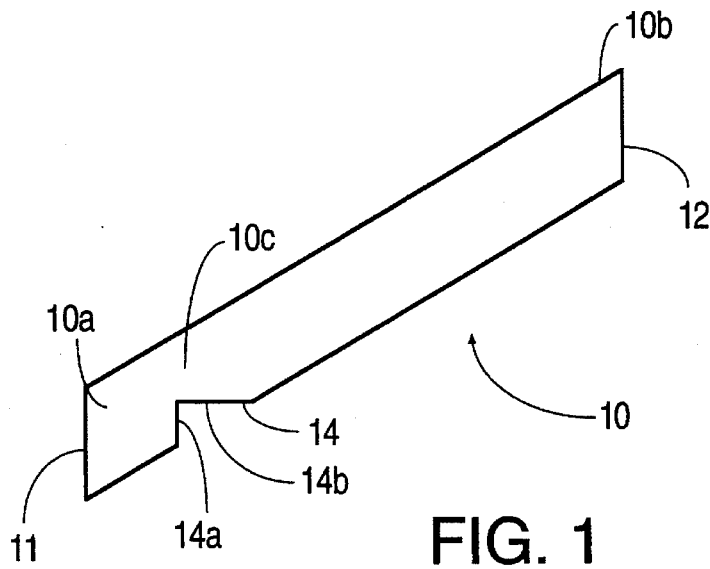
FIG. 1 is a schematic side view of a typical wood rafter of the prior art showing normal rafter cuts used in roof construction.

One of the prime uses of the invention is for properly making rafter cuts typically in roof forming constructions. As seen in prior art FIG. 1 a rafter 10 typically a 2×6 or 2×8 beam nominally 3.8 cm in thickness and 14.0 to 19.1 cm in width and of various lengths are cut at one end 10a with a plumb (vertical) cut 11 which has been scribed or otherwise marked by a pencil using a square. The beam is subsequently cut across the scribed line by sawing. In completing a roof a facia board may connect the plumb cuts of adjacent rafters or the rafter plumb-cut ends may project from the structure's walls. A complimentary vertical ridge cut 12 is scribed or marked by a tool at beam end 10b. The ridge cut connects to a ridge beam or other structure (not shown) at the line of intersection at the roof top between the opposite slopes or sides of the roof. A seat cut 14 sometimes called a "birdsmouth" cut is located displaced from beam end 10a at 10c in a position to seat on a horizontal beam (not shown) forming the top of a structure peripheral wall. The cut is in two parts namely a horizontal cut 14b and a vertical cut 14a intersecting with cut 14b to form the overall seat cut 14.

Figure 2:
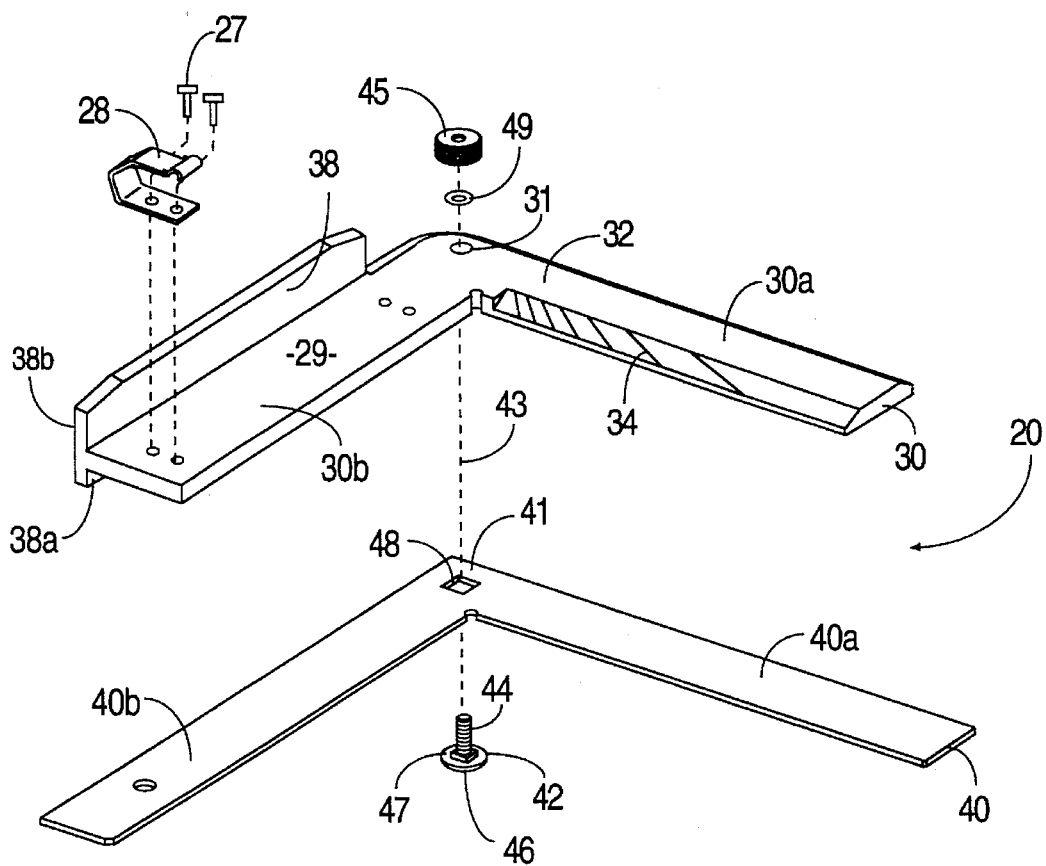
FIG. 2 is an exploded perspective view of the layout tool of the invention.
Figure 3:
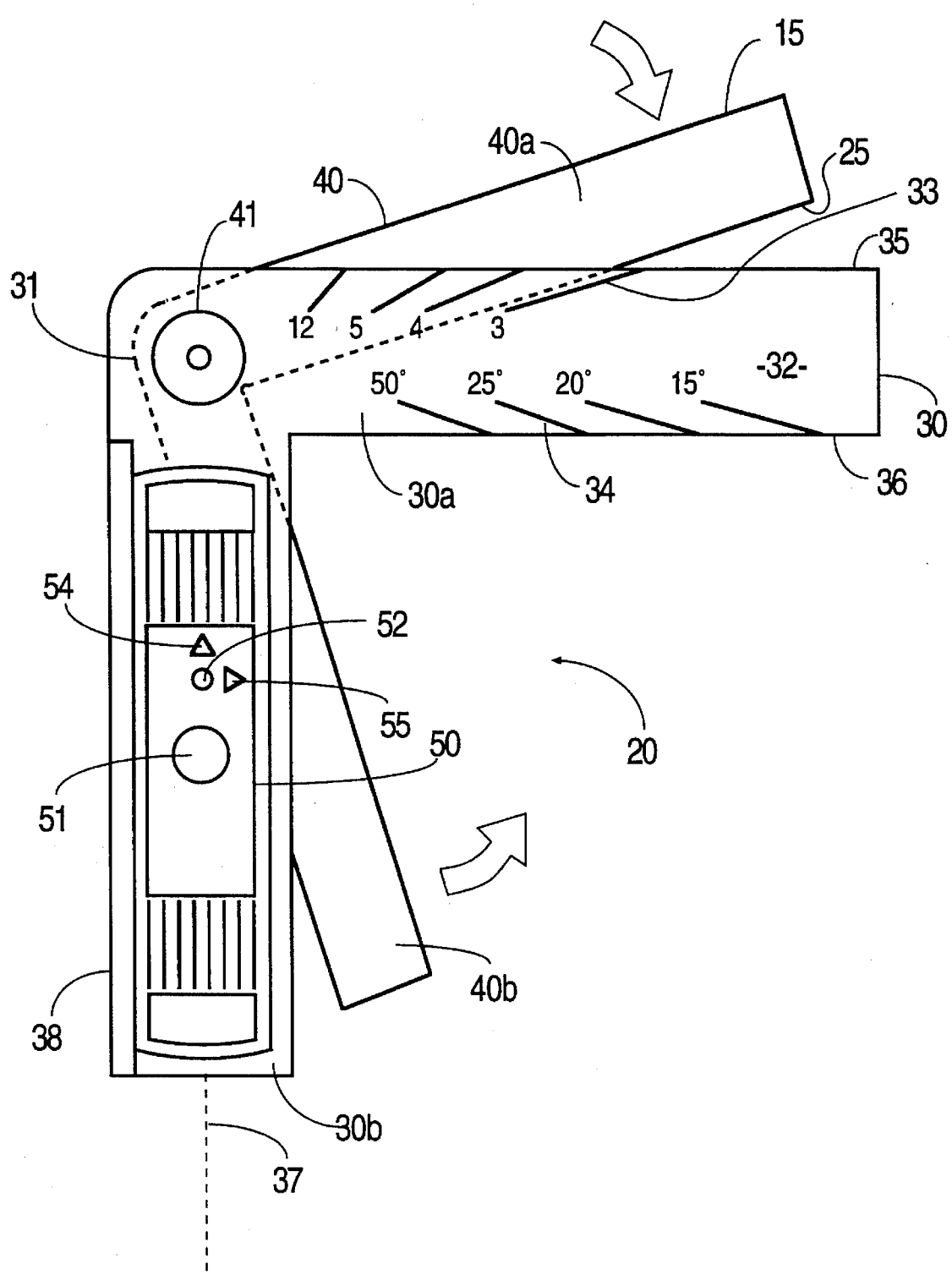
FIG. 3 is a plan view of the layout tool including an electronic level without holding clips.
Figure 4:
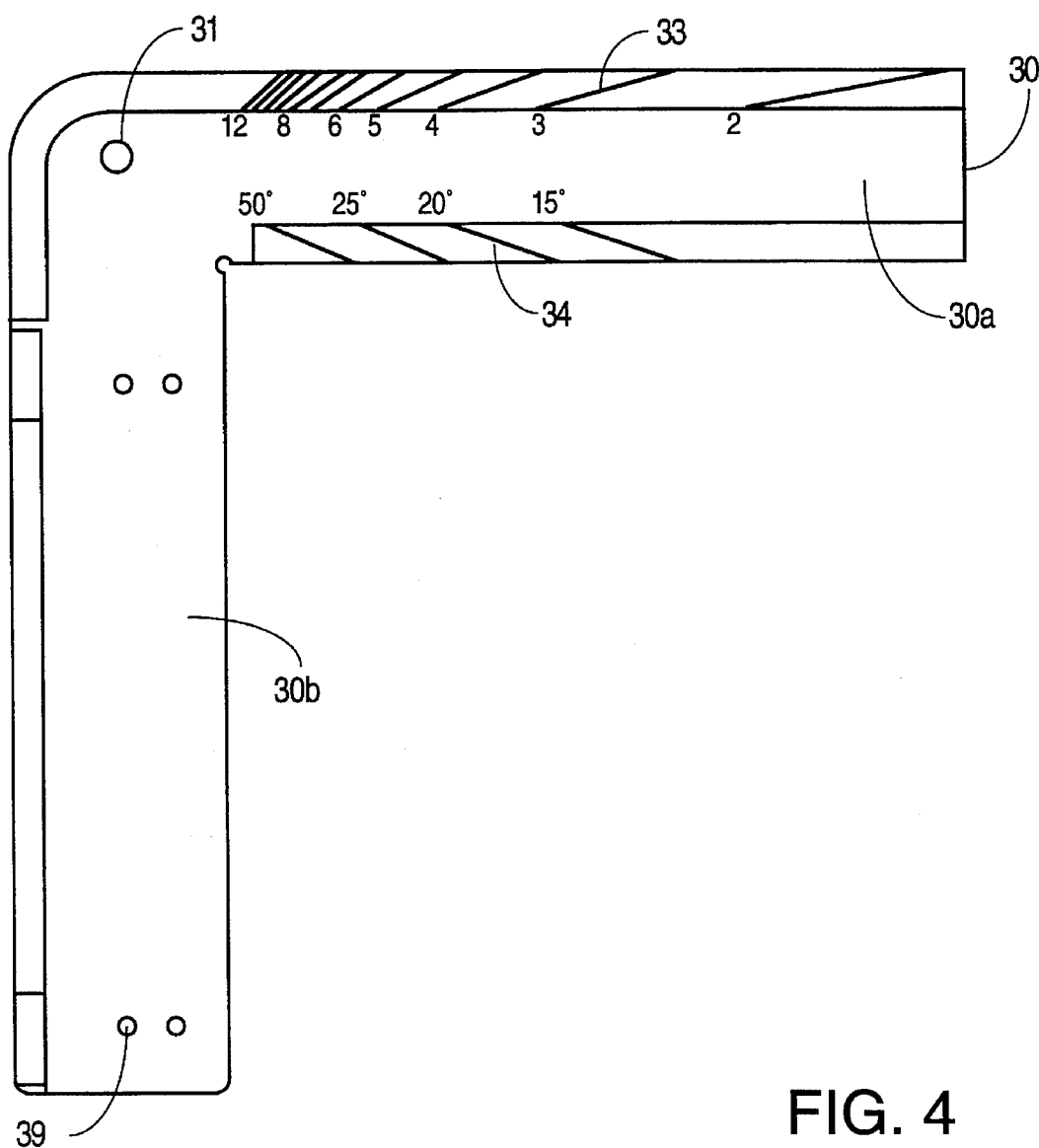
FIG. 4 is a plan view of the electronic level-holding square of the invention with a detached spring clip in perspective.
Figure 5:
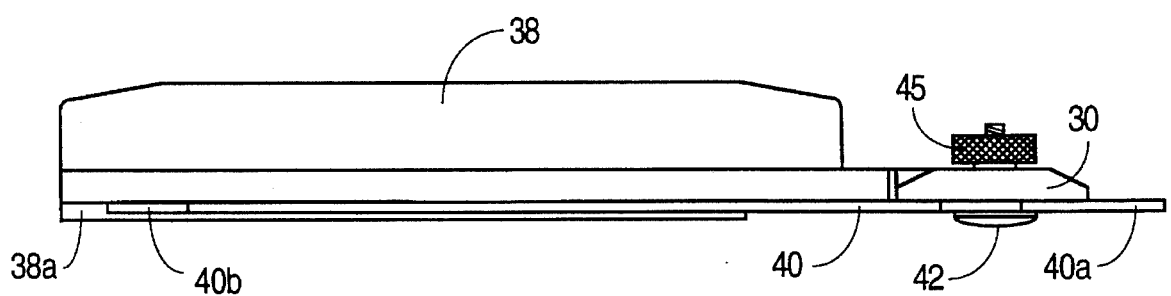
FIG. 5 is a side view of the assembled layout tool.

As seen in FIGS. 2–5 the layout tool 20 of the invention comprises two squares 30 and 40 which are pivotably joined at their respective vertices 31 and 41 by a pivot pin 42 extending through a rotation axis 43 in the respective vertices of the squares. The squares are rotatable about 360° relative to each other. The pivot pin 42 as best seen in FIG. 2 includes an integral pivot pin head 46 including a square shank 47, and a threaded upper end 44. A clamping nut 45 with washer 49 is threaded onto pin end 44 with the shank 47 seating in a square aperture 48 at the vertex 41 of square 40. The nut 45 is preferably knurled to facilitate locking of the nut against the top surface 32 of square 30 and the pressure of the pin head against the surrounding periphery of aperture 48 in the second square 40. Slight unthreading of the clamping nut 45 permits the squares to slidingly rotate with respect to each other to measure and indicate a particular inclination of an object or member.

The first square 30 and second square 40 each have two legs or arms 30a and 30b and 40a and 40b, respectively. Each pair of legs subtend an angle of 90° and preferably are of similar length. More particularly, it is preferred the length of the legs of the second square are equal to or less in length than the legs of the first square and do not project from the legs of the first square when the legs are superimposed on each other for storage or carrying with the nut locked. One of the squares preferably the square denoted as square 30, has two sets of indicia 33 and 34 extending inwardly from opposed reference edges 35 and 36 of leg 30a. Indicia 33 are rise-over-run integers and a series of sloped lines extending from the integers to reference surface or edge 35. Indicia 34 are angle designations 50°-25°-20° etc. and include a series of sloped lines extending from the degree designations to reference surface or edge 36. Indicia 34 may also be rise-over-run integers readable with respect to reference edge 15.

The other leg 30b mounts an electronic level or indicator 50 (FIG. 3) aligned along a longitudinal axis 37 of a top planar surface 29 of the leg 30b. The level 50 supplies a visual and auditory signal when the level is plumbed vertically or leveled horizontally. The electronic level may be a Zircon® ULTRALEVEL 6™ available from Zircon Corporation, Campbell, Calif. Model No. 50524. This level utilizes electrical capacitance to measure angles and is described in detail in U.S. Pat. No. 5,083,383, assigned to Zircon. The disclosure of U.S. Pat. No. 5,083,383 is incorporated herein by reference. The ULTRALEVEL 6 device incorporates a level indicator which both beeps and gives a high visibility red LED light signal when a plumb or level condition exists. The device can be used in the overhead and out-of-sight places particularly present in roof framing and rafter remodelling locations. The level 50 includes an on-off mechanical switch 51, a LED (light emitting diode) 52, horizontal and vertical arrow indicia 55 and 54 and three 1.5 v. batteries with a "low" battery indicator and automatic shut-off (not shown). A side ledge 38 integrally extends from an outer edge of leg 30b to assist in orienting the level 50 longitudinally of leg 30b. The bottom of ledge 38 may extend below the bottom of leg 30b as at 38a (FIG. 2) in which event the rotation of the second square with respect to the first square will be limited to 270°. In this embodiment, the outside surface 38b of ledge 38 may act as a squaring surface for other uses of the tool. The left side of level 50 is mounted against clips 28 mounted against the inner side of ledge 38 and is affixed to leg 30b by the spring clips 28 (one shown) attached by rivets 27 extending through apertures 39 in the leg 30b. The spring clips may be made from 1095 cold rolled carbon strip annealed temper to Rc 45–48 with a tensile strength of 200,000 PSI MIN., with zinc plating per ASTM/B-633 and a clear chromate bake.

Figure 6:
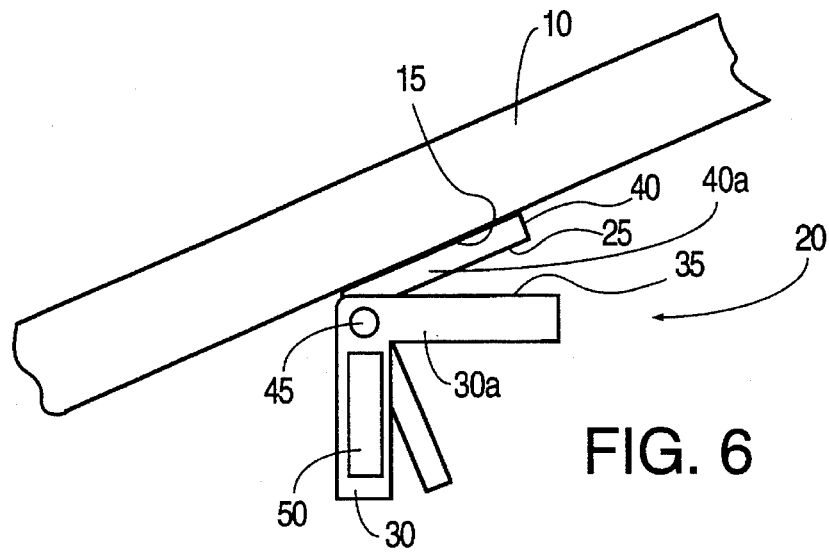
FIG. 6 illustrates a side view of a method of measuring the inclination of an existing rafter using the layout tool without indicia being shown.
Figure 7:
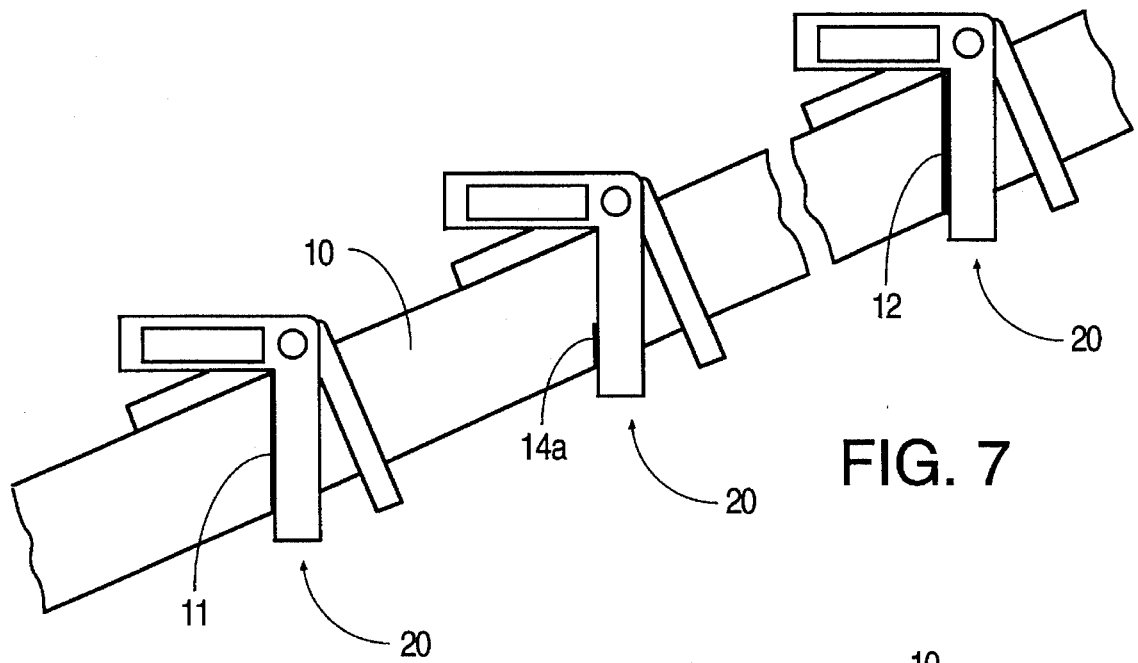
FIG. 7 illustrates in a plan view the use of the tool for the layout of a series of cuts in a new rafter.
Figure 8:
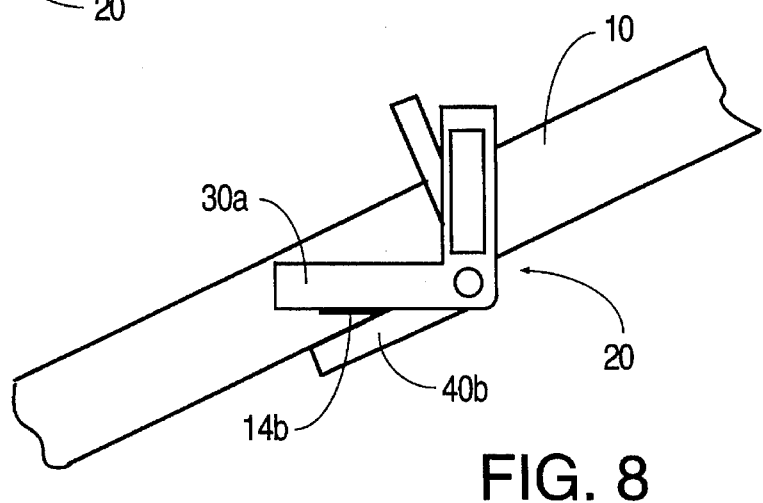
FIG. 8 illustrates in a plan view the further use of the tool to determine a second cut to complete a seat-forming cut in the new rafter.

FIGS. 6–8 illustrate the use of the layout tool 20 when making a roof rafter layout. As seen in FIG. 6 the leg or blade 40a of the second square 40, more particularly a reference edge 15 is placed against the rafter 10 whose pitch, inclination or slope is desired to be duplicated. The first square or frame is oriented and adjusted to vertical plumb using the electronic level fixedly mounted thereon. When the auditory beep and visual LED plumb signal is obtained the knurled nut 45 is turned to lock the square or frame 30 abuttingly against square 40. At this point the angle may be read at the locked intersection of the reference edges 35 and 25 of the legs 30*a* and 40*a*, respectively.

As seen in FIG. 7, using the legs 40*a*, 40*b* and 30*a* the scribing of a plumb cut, the ridge cut and the portion 14*a* of the seat cut 14 (using legs 40*a* and 30*a*) can be made. The other portion 14*b* of the seat cut is then indicated and scribed (or otherwise marked or indicated) by reorienting the tool 90° clockwise as seen in FIG. 8 using legs 40*b* and 30*a* to define the horizontal portion 14*b* of the seat cut 14. The method of rafter cutting is practiced by measuring the inclination of the inclined rafter surface by unclamping the squares to a sliding rotational condition; orienting said first square to a plumb condition; moving the second square such that a reference edge thereof extends in abutting alignment with a first edge of the inclined rafter; and clamping said squares to a locked condition; moving said locked squares as a unit to a first position wherein said locked second square reference edge abuts the rafter inclined surface in a first position and said first square indicator indicates a level condition of said first square leg and scribing a vertical mark on the rafter along a vertical edge of a second leg of said first square and indicative of a plumb cut to be made across the inclined rafter; moving said locked squares as a unit to a second position along the length of the rafter to indicate and scribe a ridge cut to be made across the rafter; moving said locked squares as a unit to a third position at a medial portion of the rafter between the plumb cut and ridge cut to indicate and scribe a first vertical part of a seat cut to be made into the inclined rafter; and turning the locked squares 90° as a unit to a fourth position immediately adjacent to the seat cut with the second square reference edge in abutting alignment with a second opposite edge of the rafter to indicate and scribe a second horizontal part of the seat cut.

In utilizing the layout tool, the leg 30*a* is placed in an approximate level (horizontal) position (FIG. 8) with the arrow 55 on the electronic level 50 pointing up. When the exact horizontal level is reached, the red LED 52 will be ON and the buzzer tone will sound. Likewise, when it is desired that the electronic level 50 be in a plumb position (FIGS. 7 and 9) the leg 30*a* is placed in an approximate plumb (vertical) position with the arrow 54 on the electronic level 50 pointing up. When the leg 30*a* and electronic level 50 are exactly plumb the red LED will be ON and the tone will sound, allowing one to either lock the clamping means at that occurrence or to make or scribe an appropriate cut line.

Unlike the SmartLevel or INOGON levels, there can be no entry error in the present invention in transferring a visual angle reading to another device for scribing or indicating the cuts in a rafter. In the present invention the angle is fixed by the tightening of the clamping nut. Further, having the level on the planar surface 29 of a square allows greater visual access to the level and plumb indicator. The auditory signal permits blind leveling or plumbing.

The above description of embodiments of this invention is intended to be illustrative and not limiting. Other embodiments of this invention will be obvious to those skilled in the art in view of the above disclosure.

I claim:

1. A layout tool for indicating inclination of an inclined surface comprising:

a first square having legs extending at 90° from a first vertex;

a second square having legs extending at 90° from a second vertex, said second square being pivotally joined to said first square in a plane parallel to said first square;

a pivot pin extending through said vertices; and a clamp for fixedly clamping said pin and said squares in a rotational plane after said first and second squares have been angularly rotated with respect to each other over an angle representative of an angle between the inclined surface and a vertical or horizontal reference.

2. The tool of claim 1 wherein a leg of said first square includes an outer reference surface having juxtaposed indicia line markings indicative of the rise-over-run inclination of the inclined surface with respect to said outer reference surface in a first clamped relative position of said squares.

3. The tool of claim 2 wherein said first square leg includes an inner reference surface having juxtaposed indicia line markings indicative of angle graduations between the squares in a second clamped relative position of said squares.

4. The tool of claim 1 wherein the legs of said second square are equal to or less in length than the legs of said first square and do not project from the legs of the first square when said squares are superimposed on each other.

5. The tool of claim 1 wherein said clamp comprises a knurled nut threadedly connected to a threaded end of said pivot pin and adapted to the threaded into clamping abutment with said first vertex, said pivot pin including a head and square shank engageable in clamping abutment with said second vertex.

6. The tool of claim 1 wherein one of the legs of said first square includes a plumb and level indicator for determining the orientation of said vertical or horizontal reference surface.

7. The tool of claim 6 wherein said indicator includes a visual and auditory signal indicating the vertical or horizontal position of said reference surface.

8. The tool of claim 7 wherein said indicator is an electronic level and plumb indicator affixed to a planar surface of said one leg along a longitudinal axis of said one leg.

9. The tool of claim 8 wherein said one leg includes an orthogonal ledge attached to an outer edge of said one leg, a longitudinal edge of said one leg being in abuttment with said ledge.

10. The tool of claim 9 wherein said ledge extends below a bottom surface of said one leg such that said ledge extension functions as a stop for said second square.

11. The tool of claim 9 wherein said one leg mounts a spring clip for holding said indicator and urging said indicator against said ledge.

12. The tool of claim 1 wherein said squares are in sliding abutment with each when said clamp is in a clamp released mode of operation.

13. An inclined rafter layout method utilizing a layout tool having a first square; a second square pivotably connected to said first square by a clampable pivot pin extending through the vertex of each of said squares; and a plumb and level indicator on a leg of said first square, said method comprising:

measuring the inclination of the inclined rafter surface by unclamping the squares to a sliding rotational condition; orienting said first square to a plumb condition; moving the second square such that a reference edge thereof extends in abutting alignment with a first edge of the inclined rafter; and clamping said squares to a locked condition;

moving said locked squares as a unit to a first position wherein said locked second square reference edge abuts the rafter inclined surface in a first position and said first square indicator indicates a level condition of said first square leg and scribing a vertical mark on the rafter along a vertical edge of a second leg of said first square and indicative of a plumb cut to be made across the inclined rafter;

moving said locked squares as a unit to a second position along the length of the rafter to indicate and scribe a ridge cut to be made across the rafter;

moving said locked squares as a unit to a third position at a medial portion of the rafter between the plumb cut and ridge cut to indicate and scribe a first vertical part of a seat cut to be made into the inclined rafter; and turning the locked squares 90° as a unit to a fourth position immediately adjacent to the seat cut with the second square reference edge in abutting alignment with a second opposite edge of the rafter to indicate and scribe a second horizontal part of the seat cut.

* * * * *